UNITED STATES PATENT OFFICE.

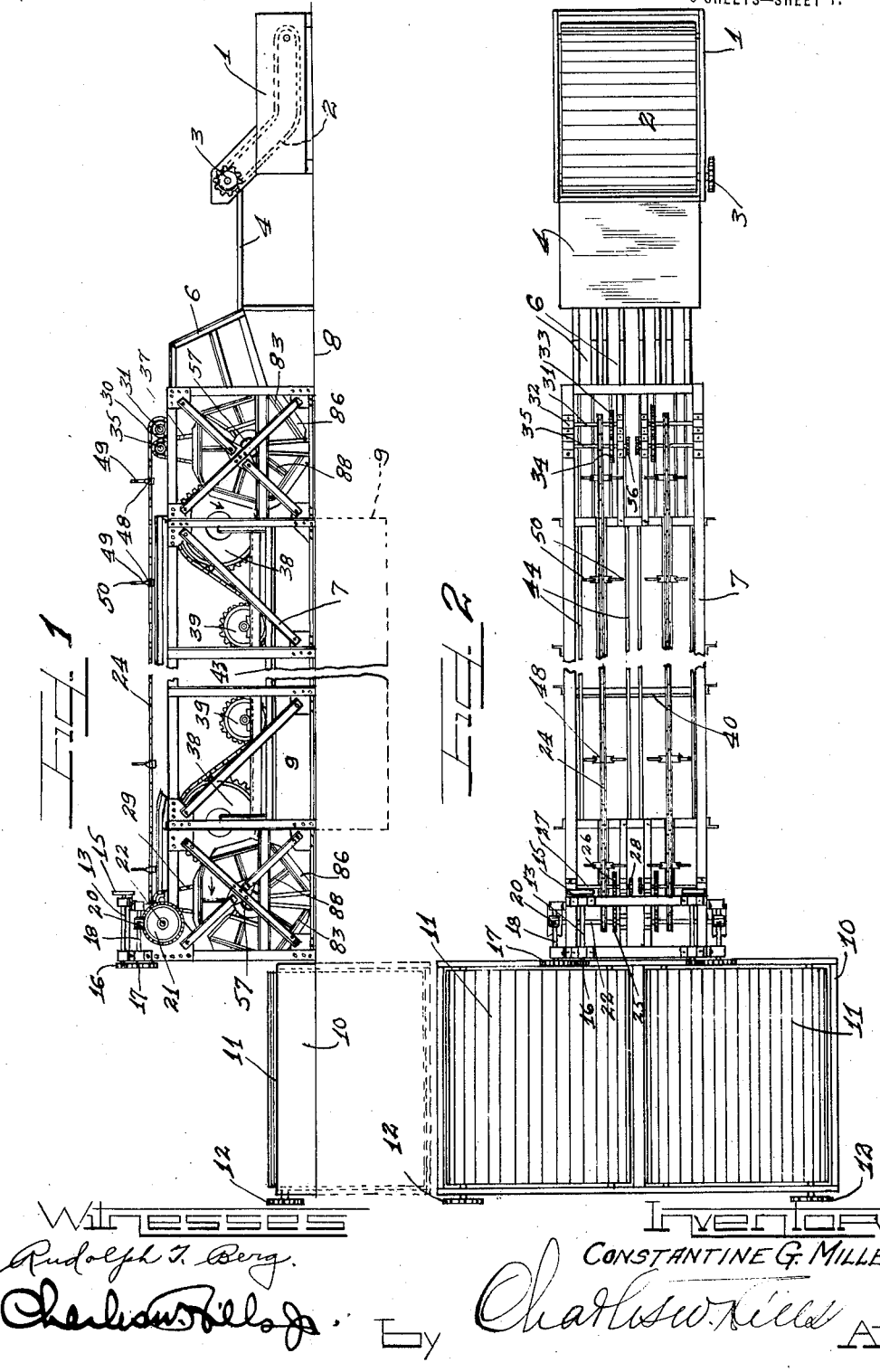

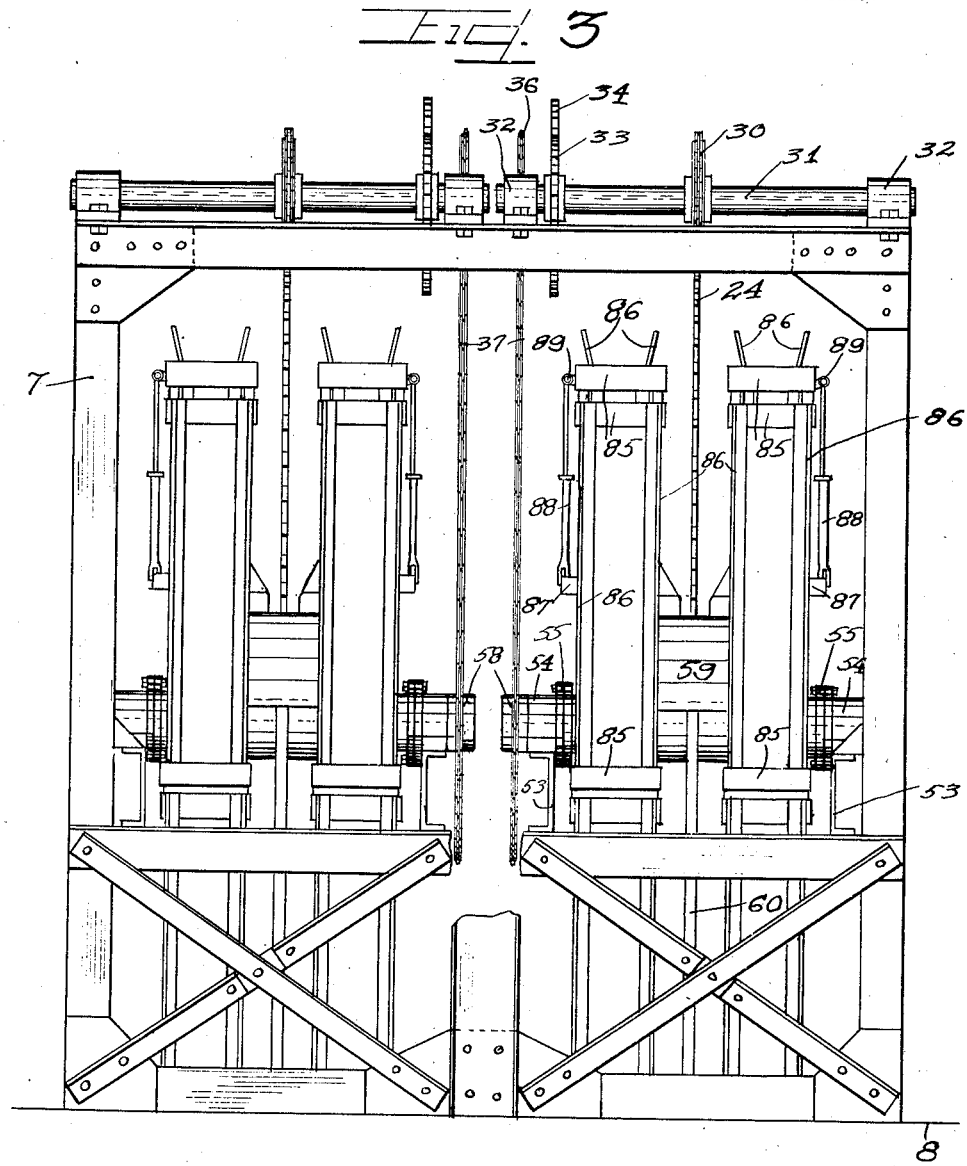

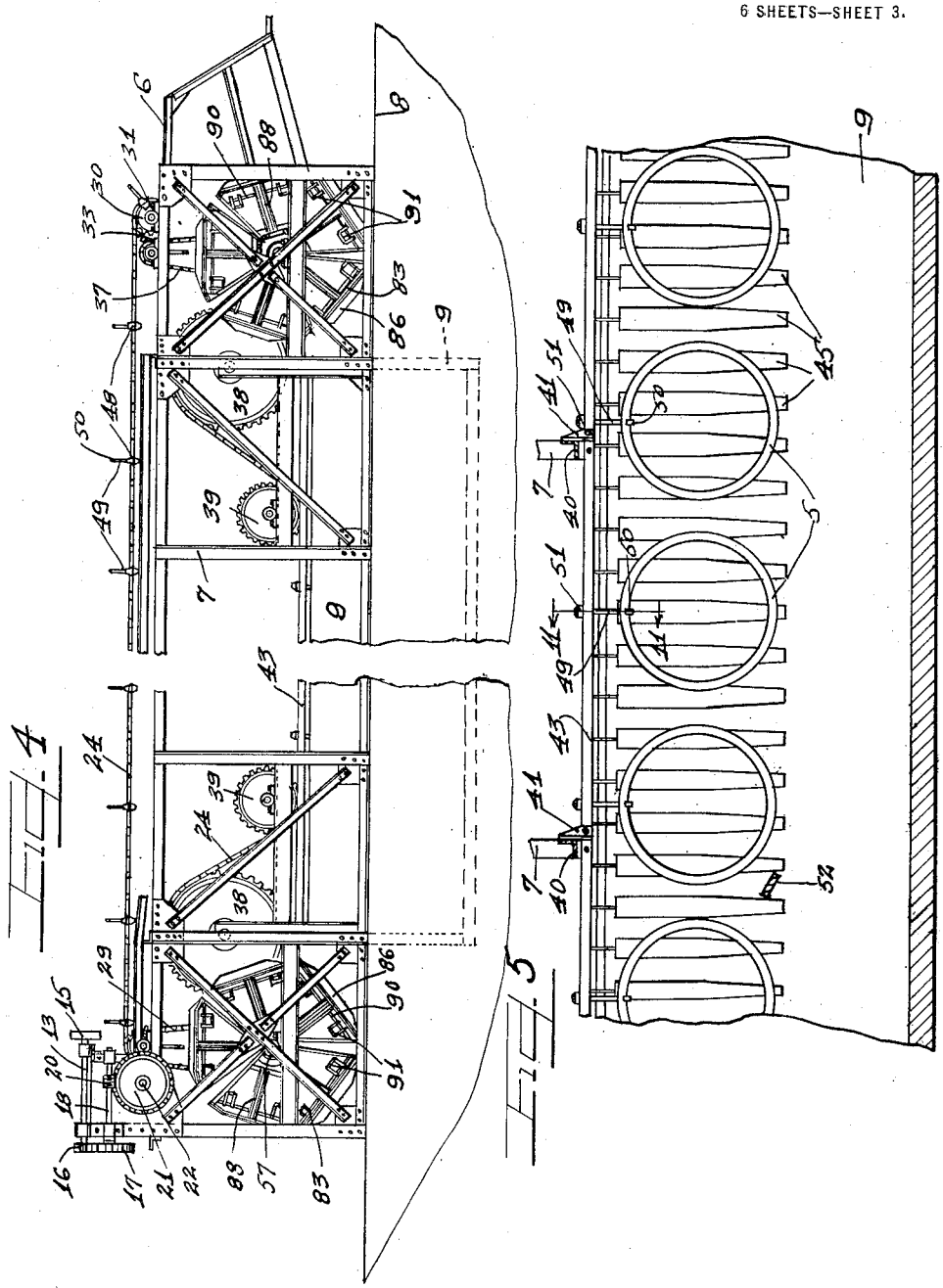

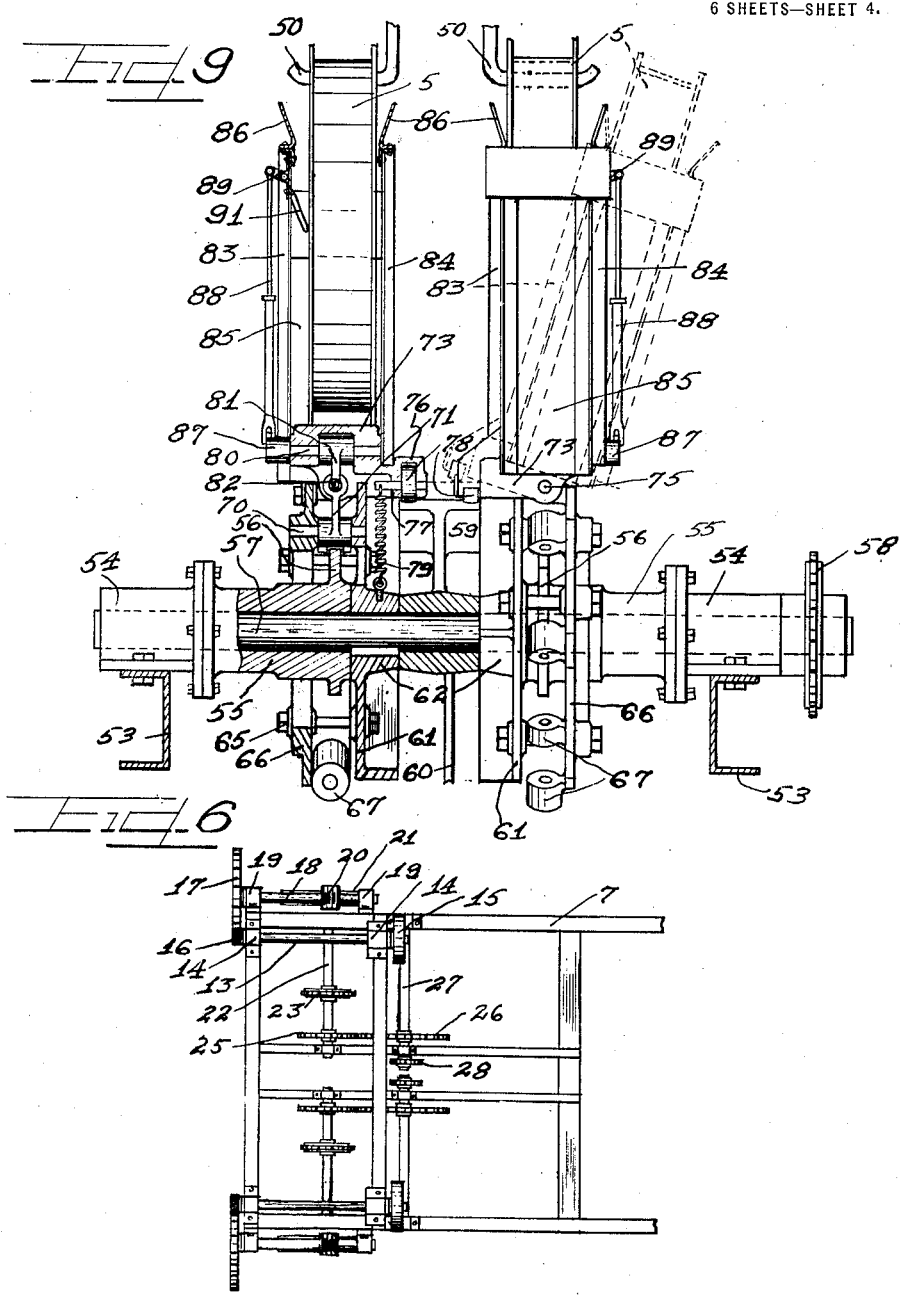

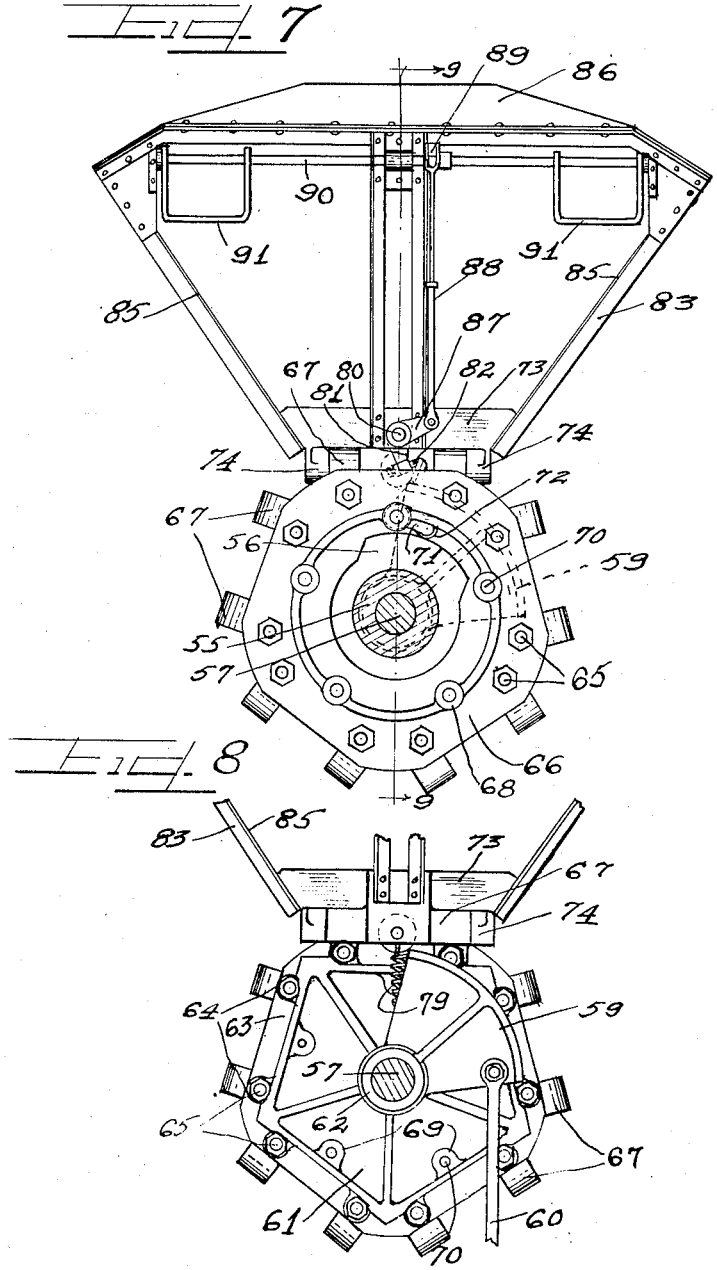

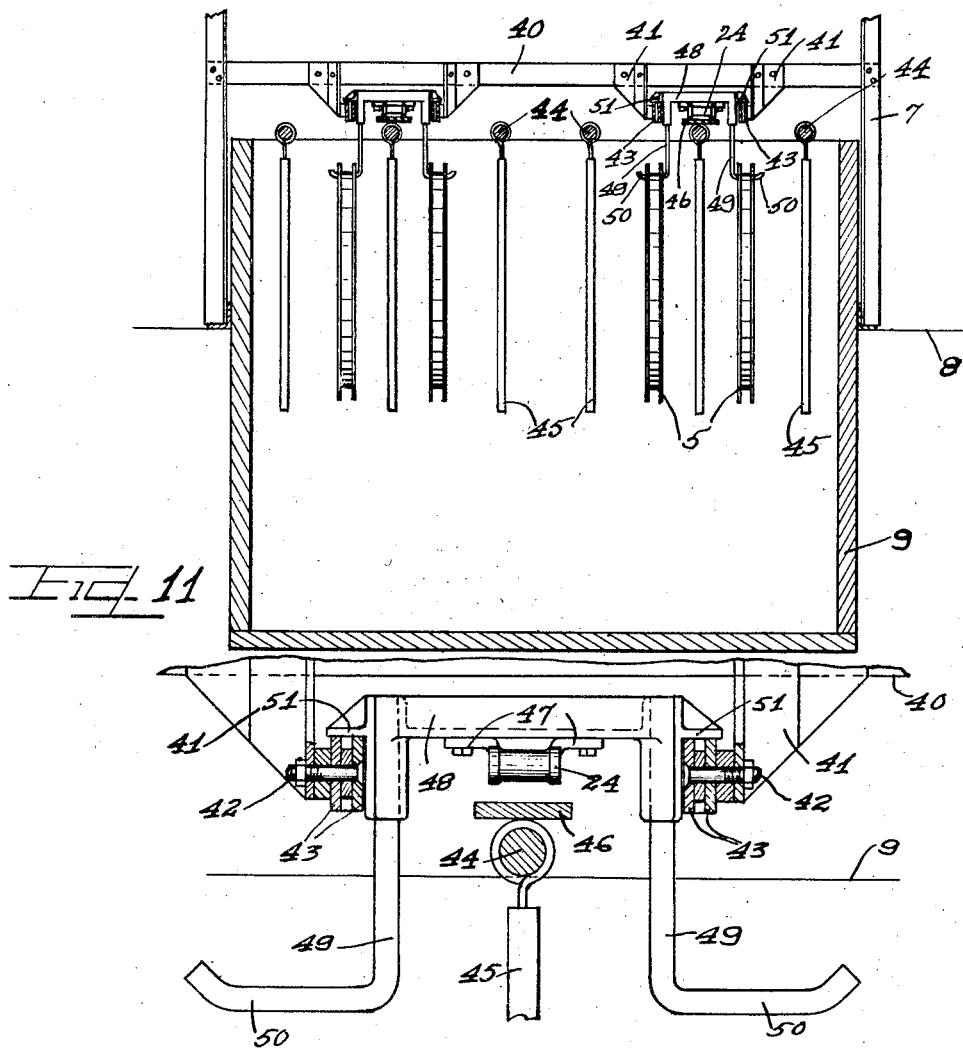

CONSTANTINE G. MILLER, OF CHICAGO, ILLINOIS, ASSIGNOR TO MEAKER GALVANIZING COMPANY, OF CHICAGO, ILLINOIS, A CORPORATION OF ILLINOIS.

GALVANIZING-MACHINE.

1,378,888.  Specification of Letters Patent.  Patented May 24, 1921.

Application filed March 19, 1920. Serial No. 367,082.

*To all whom it may concern:*

Be it known that I, CONSTANTINE G. MILLER, a citizen of the United States, and a resident of the city of Chicago, in the county of Cook and State of Illinois, have invented certain new and useful Improvements in Galvanizing-Machines; and I do hereby declare that the following is a full, clear, and exact description of the same, reference being had to the accompanying drawings, and to the numerals of reference marked thereon, which form a part of this specification.

This invention relates more particularly to an improved type of an electro-galvanizing machine adapted for galvanizing automobile rims, felly bands, tire carriers and similar circular articles, which after being washed are delivered into a cradle and automatically fed to a hook carrying conveyer which acts to carry the articles through a galvanizing solution and then automatically discharge the articles upon a conveyer platform to be delivered to a rinsing tank.

In connection with this invention, attention is called to my co-pending application for an "electrogalvanizing machine," filed February 3d, 1920, Serial No. 566,066.

It is an object of this invention to provide an electro-galvanizing machine adapted to automatically feed articles into a galvanizing solution and then automatically discharge the articles upon a delivery conveyer.

Another object of the invention is to provide a galvanizing machine with similarly constructed devices at the opposite ends of the machine adapted to automatically deliver articles to a conveyer and then automatically remove the articles from the conveyer after galvanization of the articles.

It is also an object of the invention to provide a galvanizing machine wherein an endless conveyer is synchronized with rotatable feeding and discharge cradle wheels to permit articles to be automatically delivered to and removed from supporting hooks carried by the conveyer.

A further object of this invention is to provide an electro-galvanizing machine constructed to automatically feed and carry articles through a galvanizing solution in circuit with stationary cathodes and anodes, and then automatically discharge the articles after they have been completely galvanized on all surfaces thereof.

It is furthermore an object of the invention to provide a galvanizing machine wherein cam actuated spring controlled cradle pockets pivoted on a rotatable hub are adapted to automatically feed rims to the hooks of the machine conveyer to permit the rims to be carried through an electrolytic solution to completely galvanize the rims, after which the galvanized rims are conducted into a rotatable discharge cradle the pivoted pockets of which are adapted at predetermined times to be automatically swung outwardly to remove the rims off of the conveyer hooks to permit said rims to roll from the discharge cradle upon a delivery conveyer.

It is an important object of this invention to provide an improved type of galvanizing machine of effective and simple form adapted to be automatically loaded and unloaded by similarly constructed rotatable cam actuated devices mounted at the ends of the machine to co-act with a hooked conveyer for carrying articles through an electrolytic solution to be galvanized.

Other and further important objects of this invention will be apparent from the disclosures in the specification and drawings.

The invention (in a preferred form) is illustrated in the drawings and hereinafter more fully described.

On the drawings:

Figure 1 is a side elevation, partly broken away, of a galvanizing machine embodying the principles of this invention.

Fig. 2 is a top plan view thereof.

Fig. 3 is an enlarged elevation of the loading end of the machine, with parts broken away.

Fig. 4 is an enlarged fragmentary side elevation of the machine with parts omitted.

Fig. 5 is a fragmentary detail view taken longitudinally through a portion of the galvanizing tank.

Fig. 6 is a top plan view of the driving mechanisms shown at the unloading end of the machine.

Fig. 7 is an enlarged detail side view of the automatic loading mechanism partly shown in section and with parts omitted.

Fig. 8 is an enlarged fragmentary side elevation of the hub and cam mechanisms of the loading cradle showing a fragmentary part of one of the cradle pockets.

Fig. 9 is a sectional view taken on line 9—9, of Fig. 7, with parts in elevation and with parts omitted, the operation of one of the cradle pockets being disclosed in dotted lines.

Fig. 10 is a transverse section taken through the galvanizing tank.

Fig. 11 is an enlarged detail section of one of the conveyer hook devices taken on line 11—11, of Fig. 5, and disclosing parts in elevation.

As shown on the drawings:

The reference numeral 1, indicates a water tank which is located at the loading end of the galvanizing machine. The water tank 1, is provided with an endless conveyer 2, which is adapted to be driven by any suitable source of power through the sprocket wheel 3, mounted at one end of the upper conveyer shaft.

Connected with the water tank is one end of a loading platform 4, which is positioned to conveniently receive from the conveyer 2, automobile rims or similar articles 5, to be galvanized. The other end of the platform 4, is rigidly connected with the front ends of a plurality of guide chutes 6, which are securely mounted at the loading or entrance end of a long supporting frame 7. The frame 7, is preferably constructed of angle irons and channels, and is supported on the ground or on a floor 8, longitudinally over a pit. Seated in the pit is a long galvanizing tank or trough 9, which holds the electrolyte or galvanizing solution. The galvanizing tank 9, projects above the level of the floor between the frame uprights. Mounted at right angles across the unloading or discharge end of the frame 7, is a hot water rinsing tank 10, having two endless discharging conveyers 11, mounted therein and adapted to move in opposite directions. Each of the conveyers 11, is adapted to be driven by means of a sprocket wheel or gear 12, secured on the projecting end of one of conveyer shafts. The sprocket gears 12, of the conveyers 11, are adapted to be driven by means of chains connected with any suitable source of power.

As clearly shown in Figs. 2 and 3, the machine really embraces two duplicate machines each adapted to be independently operated but both mounted on the frame 7, for co-action with the galvanizing tank 9. Two independently operated driving mechanisms of similar construction are provided at the unloading or discharge end of the frame 7, as shown in Fig. 6. Each driving mechanism embraces a longitudinal shaft 13, supported in bearings 14, and having a pulley wheel 15, engaged on the inner end and a pinion 16, on the outer projecting end. The pulley 15, is adapted to be connected by a belt with any suitable source of power. Meshing with the pinion 16, is a gear 17, secured on the rear or projecting end of a worm shaft 18. The worm shaft 18, is supported by bearings 19, secured to the side of the frame 7. A worm 20, is keyed or otherwise secured on the shaft 18, in position to mesh with a worm gear 21. The worm gear 21, is secured on the outer end of a transverse conveyer shaft 22, supported on the frame 7. A sprocket wheel 23, is engaged on the shaft 22, intermediate the ends thereof to permit an endless conveyer chain 24, to be trained therearound. Also secured on the shaft 22, near the inner end thereof is a gear 25, which meshes with a gear 26, mounted on an auxiliary transverse shaft 27, which is journaled in suitable bearings on the frame 7. A sprocket gear 28, is secured on the inner end of the shaft 27. Trained around the sprocket gear 28, is an endless chain 29.

The conveyer chain 24, extends longitudinally of the machine and at the loading end of the frame 7, passes around a sprocket wheel 30, which is engaged on a shaft 31, the ends of which are journaled in bearings 32, secured on the top of the frame 7, as shown in Fig. 3. Also secured on the shaft 31, is a gear 33, which is in mesh with a gear 34, mounted on a shaft 35. The shaft 35, is parallel to the shaft 31, and is journaled in suitable bearings secured to the frame 7. A sprocket gear 36, is keyed on the inner end of the shaft 35, and has an endless chain 37, engaged thereon. As shown in Figs. 1 and 4, the conveyer chain 24, is engaged over two large sprocket guide wheels 38, and passes downwardly to engage beneath two small sprocket guide wheels 39. The sprocket wheels 38 and 39 are journaled in suitable bearings mounted on the machine frame 7. The conveyer chain 24, is thus caused to pass longitudinally over the top of the galvanizing tank 9.

Rigidly secured to the uprights of the frame 7, are transverse cross-bars or beams 40, spaced a short distance above the top of the galvanizing tank 9, as disclosed in Figs. 10 and 11. Riveted or otherwise secured to each cross-bar 40, are a plurality of downwardly projecting brackets 41. Secured by means of bolts 42, to the brackets 41, are a pair of spaced parallel copper rails or bus bars 43, which form stationary cathodes. The bus bars are disposed longitudinally above the tank 9, and afford guide rails.

Mounted longitudinally on the top of the tank 9, between the bus bars 43, and on each side of said bus bars, are parallel rods 44, from which are suspended at intervals a plurality of anode bars 45, which project into the electrolytic solution within the tank 9. The bus bars or cathodes 43, are connected with one pole of an electric generator (not shown) while the anode supporting rods 44, are connected with the other pole of said generator. Supported by the tank 9, longitudinally above the middle anode supporting rod 44, is an insulator board 46.

The conveyer chain 24, is made up of pivotally connected links. Certain of the conveyer chain links are provided with supporting arms 47. Connected by bolts to the chain arms 47, and at spaced intervals from one another, are a plurality of rim or article carrying devices, shown in Fig. 11, and each comprising a channel or U-shaped yoke 48, the arms of which are drilled to receive the supporting arms 49, of outwardly directed copper hooks 50. Integrally formed on opposite sides of each chain yoke 48, are guide flanges or shoes 51, adapted to slidably ride on the bus bars 43, to support the conveyer chain 24, in its passage over the top of the tank 9. The hooks 50, are adapted to support and carry the rims 5, through the solution in the tank 9, and between the rows of anodes 45, as clearly shown in Fig. 10. The insulator board 46 prevents the conveyer chain 24, from contacting the middle anode supporting rod 44. Secured at intervals across the interior of the tank 9, are transverse inclined bars 52, which are positioned in the path of the rims 5 to cause said rims to be temporarily elevated during their progress through the tank to permit the supporting hooks 50, to change their hold on said rims so that all parts of the rims may be thoroughly galvanized.

Automatic loading mechanism is provided at the loading end of the machine, and an automatic unloading mechanism is provided at the other or unloading end of the machine. The loading and the unloading mechanisms or devices are identical in construction, and a detailed description will therefore only be given of the loading mechanism which is clearly shown in Figs. 3, 7, 8 and 9. Rigidly supported longitudinally on the frame 7, beyond the end of the tank 9, are parallel channel irons 53, for supporting flanged shaft bearings 54. Bolted to the flanges of the bearings 54, are bearing sleeves 55, each of which has integrally formed near the inner end thereof a finger cam 56. Journaled in the bearings 54 and in the bearing sleeves 55, is a cradle supporting shaft 57. Keyed or otherwise secured on the inner projecting end of the cradle shaft 57, is a drive sprocket 58, around which the endless chain 37 is engaged.

Mounted on the cradle shaft 57, adjacent the inner ends of the bearing sleeves 55, are two rim loading wheels separated by means of a cradle cam 59, loosely engaged on the cradle shaft 57, and held stationary by means of a rod or bar 60, one end of which is secured to the cradle cam 59, and the other end to the machine frame 7.

Each rim loading wheel comprises a cradle center plate 61, provided with an integral hub 62, which is keyed on the cradle shaft 57. The center plate is pentagonal in shape, and each of the five edges thereof is provided with a flange 63, provided with apertured bosses 64, near the ends thereof. Secured in spaced relation to the first cradle center plate 61, by means of bolts 65, is a second pentagonal cradle center plate 66, the middle portion of which is removed. Integrally formed on each of the five outer edges of the plate 66, are a plurality of spaced hinge members or rings 67. Integral with the inner margin of the plate 66, are a plurality of apertured bosses 68, one for each of the five portions of said plate. An apertured boss 69, is also integrally formed at the central portion of each of the five sections of the cradle plate 61. Supported by the apertured plate bosses 68 and 69, are pins 70, on each of which is pivotally mounted a bell crank 71, disposed in the plane of the finger cam 56. A roller 72, is rotatably supported on the end of the shorter bell crank arm to co-act with the finger cam 56. Pivotally connected to the center or hub plates of the loading wheel and rotatable therewith are five cradles or pockets each embracing a cradle base 73, provided with integral hinge members 74, adapted to be connected with the hinge members 67, by a hinge bolt, or pin 75. Integrally formed on the inner side of the base 73, is a yoke bracket 76, the arms of which support a pin 77. Rotatable on the pin 77, between the arms of the yoke bracket 76, is a roller 78, adapted to co-act with the stationary cradle cam 59. Connected with a projecting end of the pin 77, is one end of a coiled spring 79, the other end of which is connected to the hub 62, of the first cradle hub plate 61. Projecting transversely through the cradle base 73, is a pin 80, having keyed to the middle portion thereof within an opening formed in the base 73, an arm or lever 81, the end of which has adjustably threaded therethrough an adjusting screw 82, adapted to contact the end of the long arm of the bell crank 71. Rigidly secured to the cradle base 73, are two side frames 83 and 84, connected by two inclined radial end walls 85, to afford a rim pocket. Secured to the outer angle members of the cradle side frames 83 and 84, are outwardly inclined guide flanges or flare plates 86. Keyed on the extending end of the pin 80, is a crank or arm 87, to the end of which is pivotally connected one end of a connecting rod 88, the upper end of which is pivotally connected to one end of a crank or lever 89. The crank 89, is secured on a shaft 90, journaled in suitable bearings on the outer side of the cradle side frame 83. Secured at the end portions of the shaft 90, are two wire flaps or rim adjusters 91.

The operation is as follows:

The articles to be galvanized, which in this case are automobile rims 5, are first deposited in the water tank 1. From the tank 1, the rims 5, are carried upwardly by the conveyer 2, and deposited upon the platform 4, from which said rims are adapted to be manually fed or rolled into the guide chutes 6, in vertical position.

The conveyer chains 24, are adapted to be independently operated at the same or at different speeds, since each chain is provided with a separate driving mechanism. The machine is of a duplex type. The operation will relate to one side of the machine only since both sides are similarly operated and controlled. The driving belt engaged on the driving pulley wheel 15, is rotated from a suitable source of power, and causes rotation of the shaft 13 and the worm shaft 18. A drive is thus transmitted through the worm 20 and the worm wheel 21, to the shaft 22 and the sprocket wheel 23, around which the conveyer chain 24, is engaged. The chain 24, is thus operated and acts to rotate the sprocket wheel 30, and the shaft 31, at the loading end of the machine. The drive from the shaft 31, is transmitted to the shaft 35, by the meshing gears 33 and 34. Rotation of the shaft 35, causes rotation of the sprocket 36, and operation of the endless chain 37, which in turn drives or rotates the shaft 57, and the loading wheels or drums, which co-act with the conveyer chain 24, and the hooks 50, thereof.

As the feeding or loading wheels are rotated the rims 5, from the guide chutes 6, are permitted to roll into the pockets of the wheel cradles, each of which is adapted to carry a single rim. As a carrying cradle into which a rim 5, has been rolled, continues to rotate and moves away from a rim receiving or loading position, the roller 78, of said cradle engages and rides over the stationary cradle cam 59, thereby automatically causing the cradle to be pivotally swung outwardly into the dotted line position of Fig. 9, against the action of the cradle controlling spring 79, which is tensioned by the swinging movement of said cradle. The cradle is swung outwardly into an inclined position, to permit a hook 50, rounding the bight at the loading end of the machine, to be brought into position adjacent the tilted cradle. Shortly after the tilting of the cradle the cradle roller 72, engages the stationary finger cam 56, and rides thereover. This causes the bell crank 71, to be partially rotated or rocked causing the long arm of said bell crank to press against the adjusting screw 82, of the lever 81. Said lever 81, is accordingly operated thereby turning the pin 80, which in turn acts to move the crank 87, inwardly whereby the connecting rod 88, is tensioned and serves to pull downwardly on the lever 89, to cause rotation of the shaft 90, and an inward movement of the adjusters 91, which adjust the rim 5, within the cradle pocket and hold the same against the opposite wall of said cradle in position to permit loading.

With the continued movement of the cradle, the cradle roller 78, moves off of the cradle cam 59, thereby permitting the stressed spring 79, to act automatically to pull the tilted cradle back into vertical position as shown in full lines in Fig. 9. With the automatic return of the cradle to vertical position the projecting end of the rim 5, carried by the cradle, is automatically moved into position to engage over a conveyer chain hook 50. As the chain 24, advances the hook 50, moving therewith acts to pull the rim 5, out of the rotating cradle. As soon as the cradle roller 72, passes over the stationary finger cam 56, the rim adjusters 91, are permitted to automatically return to normal position.

A rim 5, having been automatically loaded onto one of the conveyer chain hooks 50, is carried downwardly by the chain 24, into and through the electrolytic solution within the tank 9, between the anodes 45. As a hook carrying yoke 48, reaches the upper portion of the entrance end of the tank 9, the shoes 51, of said yoke slide onto the bus bars 43, and the rim 5, becomes part of the cathodes. During the progress of the rim 5, through the tank between the anodes 45, the electrolytic action set up in the solution gradually and evenly plates or galvanizes the rim with the material of which the anode bars 45, are made. At intervals during the progress of a rim 5, through the tank 9, the rim is brought into contact with the inclined cross bars 52, shown in Fig. 5, to cause said rim to be slightly elevated and rolled to cause the same to shift on the hook 50, so that all parts of the rim may be galvanized.

When a rim reaches the discharge end of the tank 9, the chain 24, carries the rim upwardly out of said tank. The rim upon leaving the electrolytic solution is drained as it approaches the automatic unloading or discharge mechanism. The unloading mechanism is constructed exactly the same as the loading mechanism.

As a galvanized rim is lifted out of the discharge end of the tank 9, the chain 24, acts to carry the rim into the pocket of one of the wheel cradles. When the loaded cradle moves into its uppermost position at the top of the unloading wheel the roller 78, of the cradle rolls over the cradle cam 59, and thereby acts to swing the cradle outwardly into an inclined position similar to that shown in dotted lines in Fig. 9. This operation moves the rim 5, off of the hook 50, and out of the path of the moving chain. As the cradle roller 72, engages the finger cam 56, the rim adjusters 91, are operated automatically to adjust the rim 5, in the cradle pocket. With the continued rotation of the cradle wheel the cradle roller 78, passes off of the cradle cam 59, thereby permitting the spring 79, to automatically return the tilted cradle into the plane of the cradle wheel. From this position of the rim carrying cradle the galvanized rim 5, is permitted to roll out of the cradle into the tank 10, and onto one of the discharge conveyers 11, at the unloading end of the machine. The discharge conveyer 11, carries the galvanized rim outwardly to one side of the machine and discharges the rim into a suitable receptacle from which it may be removed by any suitable means.

It will be noticed that the machine is of a duplex type and that a plurality of rims or articles may be automatically loaded onto the conveyer chain hooks and carried through the galvanizing tank, after which said rims are automatically unloaded by means of mechanisms constructed exactly the same as the loading mechanisms of the machine. The various main conveyer chains 24, are independently operated so that while one side of the machine is in operation the other side may be shut down.

I am aware that numerous details of construction may be varied through a wide range without departing from the principles of this invention, and I therefore do not purpose limiting the patent granted otherwise than necessitated by the prior art.

I claim as my invention:

1. In a galvanizing machine, a tank of electrolytic solution, an endless conveyer thereabove, hook members carried thereby, a rotatable hub member, and spring controlled means hingedly connected to said rotatable hub member for automatically feeding articles to said hook members to permit the conveyer to carry the articles through the electrolytic solution.

2. In a galvanizing machine, a tank of electrolytic solution, an endless conveyer thereabove, hook members carried thereby, a rotatable hub member, spring controlled article carrying cradles pivotally connected to said rotatable hub member to form a loading wheel, and cam mechanisms adapted to co-act with said cradles to actuate the same and cause articles in said cradles to be automatically loaded onto said hook members to be carried through said electrolytic solution.

3. In a galvanizing machine, a tank of electrolytic solution, an endless conveyer thereabove, hook members carried thereby, a rotatable hub member, article carrying means hinged thereto to form a loading wheel, guide chutes for guiding articles into said article carrying means, stationary cams mounted adjacent said hub member, and roller mechanisms carried by said article carrying means adapted to co-act with said cams to cause said article carrying means to automatically place the articles on said hook members to be carried through the electrolytic solution.

4. The combination with an electrolytic galvanizing machine, of a rotatable hub member, and article carrying means pivotally connected with said hub member adapted to automatically feed articles to the machine.

5. The combination with an electrolytic galvanizing machine, of a rotatable hub means, spring-controlled members pivotally connected to said hub to form a loading wheel, and means for operating the machine and said wheel to cause articles to be automatically fed to the machine.

6. In a plating machine, a tank of electrolytic solution, an endless conveyer, hook members thereon, a rotatable hub member, pocketed cradles hinged thereto to form a feed wheel adapted to carry articles, springs connected to said cradles and to said hub member to normally hold the cradles in the plane of said hub member, means for tilting said cradles to permit said hook members to be brought into position adjacent the cradles, and means for adjusting the articles in said cradles, said springs adapted to return the tilted cradles into normal position when the tilting means has been passed to cause the articles in said cradles to be automatically loaded onto said hook members for conveyance through said tank.

7. In a galvanizing machine the combination with a tank of electrolytic solution, of cathode bars mounted longitudinally above said tank, rods mounted longitudinally on said tank between and on opposite sides of said cathode bars, anodes suspended from said rods and projecting into the electrolytic solution, a conveyer above said tank, means for operating the same, hook members carried by said conveyer for engaging and carrying articles through the machine, a shaft journaled transversely at one end of said tank, a stationary bearing for said shaft, a finger cam integral therewith, a main cam on said shaft, means for holding said main cam against rotation, a hub member keyed on said shaft, cradle members hingedly connected to said hub member to form a loading wheel for the machine, springs connected to said cradle members and to said hub member for normally holding said cradle members in the plane of said hub member, main rollers carried by said cradle members adapted to co-act with said main cam to cause tilting of said cradle members after receiving articles, and mechanisms on said cradle members adapted to co-act with said finger cam to adjust and hold the articles in said cradle members, said springs adapted to automatically return said tilted cradle members to normal position after the rollers pass said cams to cause the articles carried by said loading wheel to be loaded onto said conveyer hook members to be carried through said electrolytic solution to be galvanized, and unloading means at the other end of said tank for automatically unloading the galvanized articles from said conveyer hook members after the articles leave said tank.

8. The combination with a galvanizing machine, of a tank of electrolytic solution, a hook carrying conveyer movable longitudinally of said tank, and a loading mechanism and an unloading mechanism mounted at opposite ends of said tank, said mechanisms being identically constructed and each comprising stationary cams, a rotatable hub between said cams, article carrying members hingedly connected with said hub, springs connecting said hub with said article carrying members to normally hold said article carrying members in vertical position to receive articles, rollers carried by said article carrying members adapted to co-act with one of said stationary cams to cause tilting of said article carrying members into inclined positions, and adjusting mechanisms carried by said article carrying members adapted to co-act with the other of said cams to adjust the articles in said article carrying members, said springs adapted to automatically return said article carrying members to normal position when said rollers and said adjusting mechanisms pass said cams.

9. A galvanizing machine comprising a tank of electrolytic solution, sprocket wheels mounted above said tank, a conveyer chain trained around said sprocket wheels, hooks carried by said conveyer chain, loading means for automatically loading articles onto said hooks to be conveyed through the electrolytic solution by said conveyer chain, unloading means identical in construction to said loading means adapted to automatically remove the articles from said hooks after the articles leave said tank, and stationary cam members adapted to be engaged by said loading means and said unloading means to cause operation of said loading means and said unloading means.

10. In a galvanizing machine the combination with means for conveying articles through the machine, of pivotally mounted spring controlled rotatable members, and stationary cam means for operating said members to cause the same to automatically unload articles from said conveying means, said members after passing said stationary cam means adapted to automatically return to normal position to cause discharge of the articles from the machine.

11. The combination with an electrolytic galvanizing machine, of an article feeding device comprising a rotatable hub portion, and chambered article carrying means hingedly connected to said hub portion to form a loading wheel.

12. The combination with an electrolytic galvanizing machine, of an article loading device forming a part of the machine and comprising a rotatable hub, chambered article carrying cradles hingedly connected to said hub to form a loading wheel, and springs for normally holding said cradles in the plane of said hub.

13. The combination with a galvanizing machine, of article loading and unloading devices positioned at opposite ends of said machine, each of said devices comprising stationary bearings, a shaft journaled therein, means for rotating said shaft, a hub keyed on said shaft between said bearings, stationary cams on opposite sides of said hub and through which said shaft projects, article carrying members hingedly connected to said hub to form a wheel, springs for holding said article carrying members in the plane of said hub, mechanisms on each of said article carrying members adapted to be operated by one of said stationary cams to adjust articles in said article carrying members, and rotatable means on each of said article carrying members adapted to co-act with the other of said stationary cams to tilt said article carrying members at predetermined times to permit loading and unloading of the articles.

14. The combination with a machine and the hook carrying conveyer thereof, of a frame, bearings mounted thereon, bearing sleeves secured to said bearings, finger cams integral with said bearing sleeves, a shaft journaled in said bearings and in said bearing sleeves, means for driving said shaft, wheel hubs keyed on said shaft between said bearing sleeves, a main cam on said shaft between said hubs, means connecting said main cam to said frame to hold said main cam stationary, chambered cradles hingedly connected to each of said hubs to form wheels, springs connecting said cradles to said hubs for normally holding said cradles in a vertical plane, rollers carried by said cradles for co-action with said main cam to cause tilting of the cradles at predetermined times during the rotation of said wheels, article adjusting means mounted on each of the wheel cradles, mechanisms on said cradles connected with said adjusting means, and rollers carried by said mechanisms adapted to co-act with said stationary finger cams to actuate said adjusting means whereby articles carried in said cradles are adjusted within said cradles to permit loading of said articles onto said hook carrying conveyer and unloading of said articles from said conveyer.

In testimony whereof I have hereunto subscribed my name in the presence of a subscribing witness.

CONSTANTINE G. MILLER.

Witness:
 FRED E. PAESLER.